Figure 1:
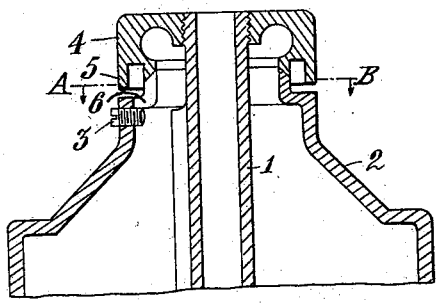

A. L. CHRISTENSON.
BLUE MILK OUTLET IN CENTRIFUGAL SEPARATORS.
APPLICATION FILED JULY 20, 1908.

982,200.

Patented Jan. 17, 1911.

Witnesses

Inventor

UNITED STATES PATENT OFFICE.

ALGOT LEVIN CHRISTENSON, OF STOCKHOLM, SWEDEN.

BLUE-MILK OUTLET IN CENTRIFUGAL SEPARATORS.

982,200.

Specification of Letters Patent. Patented Jan. 17, 1911.

Application filed July 20, 1908. Serial No. 444,404.

*To all whom it may concern:*

Be it known that I, ALGOT LEVIN CHRISTENSON, a subject of the King of Sweden, and resident of Stockholm, in the Kingdom of Sweden, have invented new and useful Improvements in Blue-Milk Outlets in Centrifugal Separators, of which the following is a specification, reference being had to the drawing accompanying and forming a part hereof.

This invention relates to improvements in blue milk outlets in centrifugal separators.

In my former application for patent Ser.
No. 370850, filed April 29, 1907, I have described a blue milk outlet in which the blue milk is caused to spread in the outer part of the outlet, before leaving the drum.

The object of the present invention is to obtain the same result, without materially changing the construction of the drums commonly used.

The invention consists, chiefly, in arranging a milk spreading wall outside the outer mouth of the blue milk outlet proper so that the blue milk issuing from the said outlet will meet the said wall and spread at its inner side before leaving the drum. Preferably, the said wall extends round about the drum, concentrically with the axis thereof, so that the milk is spread round about the drum and issues in the form of a thin conoid. Suitably, the spreading wall is formed by a flange extending downwardly from the nut screwed on the upper end of the milk inlet tube and serving to connect the parts together.

Figure 2:
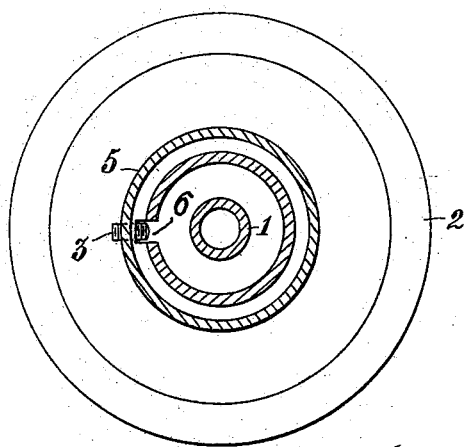

In the drawing, Figure 1 shows a central vertical section of the upper part of a centrifugal drum having a milk outlet embodying the invention. Fig. 2 is a cross-section on line A—B of Fig. 1.

Referring to the drawing, 1 is the usual milk inlet tube placed centrally within the drum 2. Inserted into the neck of the drum is a regulating screw 3 adapted to regulate the quantity of milk running through the vertical inner part of the blue milk outlet. Screwed on the upper end of the milk inlet tube is the nut 4 which is provided, according to this invention, with a downwardly projecting flange 5 extending in the path of the blue milk issuing from the outer mouth 6 of the blue milk outlet. The blue milk issuing from the outlet meets the downwardly projecting flange 5 and spreads on the inner surface thereof round about the drum before issuing in the form of a thin conoid.

It is obvious that the milk spreading wall need not be cylindrical in shape but may have any form whatsoever, such as conical, parabolic, etc. It is also obvious that the said wall need not extend round about the drum nor be concentric therewith. It may be arranged at any distance from the outlet allowing the jet of milk issuing from the outlet to meet the said wall. If the spreading wall is arranged sufficiently near the outlet, as shown in the figures, it is thought that a vacuum may be created between the drum and the wall facilitating the issue of the stream of milk.

Having now described my invention, what I claim as new and desire to secure by Letters Patent is:—

1. The combination with a centrifugal drum having a slot in the neck thereof, of a downwardly-directed flange rotating with the drum and extending in such a position relatively to the said slot as to form a spreading surface for the milk issuing from the said slot.

2. The combination with a centrifugal drum having a slot in the neck thereof, of a nut screwed on the upper part of the drum, said nut having a flange projecting downwardly in such a position in relation to the said slot as to form a spreading surface for the milk issuing therefrom.

3. The combination with a centrifugal drum having a vertical slot in the neck thereof, of a central milk inlet tube rotating with the drum, and a nut screwed on the upper end of the said tube, said nut having a flange projecting downwardly in such a position in relation to the slot in the neck of the drum as to form a spreading surface for the milk issuing from the said slot, substantially as and for the purpose set forth.

4. The combination with a centrifugal separator having a milk outlet, of regulating means situated in the said outlet, and a downwardly directed milk spreading wall rotating with the drum and extending outside the said outlet, concentrically with the axis of the drum, substantially as and for the purpose set forth.

5. The combination with a centrifugal separator having a milk outlet, of a regulating screw entering the said outlet, and a downwardly directed milk spreading wall rotating with the drum and extending outside the said outlet, concentrically with the axis of the drum, substantially as and for the purpose set forth.

6. The combination with a centrifugal separator having a milk outlet, of a regulating screw entering the said outlet, a central milk inlet tube rotating with the drum, and a nut screwed on the upper end of the said tube, said nut having a downwardly projecting flange forming a rotating milk spreading wall extending outside the said outlet, concentrically with the axis of the drum, substantially as and for the purpose set forth.

7. The combination with a centrifugal drum having a vertically slotted neck, of a central milk inlet tube rotating with the drum, a nut screwed on the upper end of the said tube and adapted to bear on the upper edge of the neck, and an annular flange projecting downwardly from the said nut in such a position in relation to the slot in the neck of the drum as to form a rotating spreading surface for the milk issuing from the said slot, substantially as and for the purpose set forth.

8. The combination with a centrifugal drum having a neck presenting at its top an obliquely extending edge and a slot cut vertically from the said edge, of a central milk inlet tube rotating with the drum and having threads at its upper end, and a nut screwed on the said threads, said nut having an eccentric annular flange the lower edge of which is obliquely cut and adapted to bear on the oblique upper edge of the neck of the drum, and a concentric annular flange surrounding the former, said latter flange having such a position in relation to the vertical slot in the neck of the drum as to form a rotating spreading surface for the milk issuing from the said slot, substantially as and for the purpose set forth.

In testimony whereof I have signed my name to this specification in the presence of two subscribing witnesses.

ALGOT LEVIN CHRISTENSON.

Witnesses:
   Aug. Sörensen,
   Karl Runcskog.